United States Patent [19]
Garfias et al.

[11] Patent Number: 5,795,005
[45] Date of Patent: Aug. 18, 1998

[54] FOLDING STORAGE COMPARTMENT

[75] Inventors: Nicolas A. Garfias, Holland, Mich.;
Stephan D. Faulkes, Greenlands, England

[73] Assignee: Prince Corporation, Holland, Mich.

[21] Appl. No.: 747,451

[22] Filed: Nov. 12, 1996

[51] Int. Cl.⁶ ............................................. B60R 7/04
[52] U.S. Cl. ................... 296/37.5; 296/37.13; 224/282; 220/9.2; 312/205; 312/275
[58] Field of Search .................... 296/37.1, 37.8, 296/37.13, 37.5; 224/282; 220/9.1, 9.2; 312/271, 275, 205

[56] References Cited

U.S. PATENT DOCUMENTS

| | | |
|---|---|---|
| Re. 26,299 | 11/1967 | Burns . |
| 864,282 | 8/1907 | Altmyer ........................... 224/483 |
| 1,401,660 | 12/1921 | White ............................... 220/9.2 X |
| 1,589,230 | 6/1926 | Roedding . |
| 1,608,240 | 11/1926 | Ross . |
| 1,877,265 | 9/1932 | Chadwick . |
| 1,893,104 | 1/1933 | Place . |
| 2,069,345 | 2/1937 | Widman . |
| 2,922,515 | 1/1960 | Barnes . |
| 3,088,771 | 5/1963 | Weigle ............................ 296/37.5 |
| 3,446,526 | 5/1969 | Peters . |
| 3,632,029 | 1/1972 | Sonner . |
| 3,730,581 | 5/1973 | Parkinson ........................ 296/152 X |
| 4,712,823 | 12/1987 | Mills et al. ....................... 296/37.8 |
| 5,505,358 | 4/1996 | Haase ............................... 224/539 |

FOREIGN PATENT DOCUMENTS

| | | | |
|---|---|---|---|
| 849209 | 11/1939 | France | ................. 396/37.5 |
| 1126198 | 11/1956 | France | ................ 296/37.13 |
| 1276591 | 10/1961 | France . | |
| 59-18045 | 1/1984 | Japan . | |
| 5338499 | 12/1993 | Japan . | |
| 6279 | of 1884 | United Kingdom | ........ 296/37.13 |
| 652208 | 4/1951 | United Kingdom . | |
| WO9104885 | 4/1991 | WIPO . | |

*Primary Examiner*—Dennis H. Pedder
*Attorney, Agent, or Firm*—Price, Heneveld, Cooper, DeWitt & Litton

[57] ABSTRACT

A storage compartment has a cover which pivots between a closed position and an open position and is pivotally mounted to a vehicle panel, such as a door, on one vertical edge. The cover includes a foldable floor section having one edge mounted to the edge of the cover and an opposite edge mounted to the vehicle such that the floor folds up when the cover is closed and opens flat when the cover is moved to an open position. A sidewall extends from the vertical edge of the cover opposite a pivot connection and is made of a collapsible material which folds in an accordion-like fashion to allow the compartment to fully collapse when the cover is moved to a closed position and expand and provide a generally triangular shaped storage compartment when opened.

20 Claims, 2 Drawing Sheets

1

FOLDING STORAGE COMPARTMENT

BACKGROUND OF THE INVENTION

The present invention relates to vehicle accessories and particularly to a folding storage compartment for a vehicle.

Vehicles frequently include, for the convenience of the passengers, a variety of storage areas such as a glove compartment, consoles with storage bins and the like. With the relative down-sizing of vehicles, storage locations are at a premium, and there remains a need for utilizing areas of the vehicle for storage heretofore unavailable. With the folding storage compartment of the present invention, relatively small areas can be employed for temporary storage of relatively large items and permanent storage of smaller items.

SUMMARY OF THE PRESENT INVENTION

The storage compartment of the present invention provides a cover which pivots between a closed position and an open position and is pivotally mounted to a vehicle panel, such as a door. The compartment includes a folding floor having one edge mounted to the edge of the cover and an opposite edge mounted to the vehicle such that the floor folds up when the cover is closed and opens to a generally flat position when the cover is moved to an open position. A collapsible or folding sidewall extends from the edge of the cover opposite the pivot connection to the vehicle and folds in an accordion-like fashion to allow the compartment to fully collapse when the cover is moved to a closed position and expand to provide a generally triangular shaped storage compartment when opened. Such a compartment can be located at a variety of convenient areas in a vehicle such as the front corner of a door panel to provide auxiliary and temporary storage for relatively large items and hold relatively small items even when closed. By providing a folding storage compartment, space heretofore unusable in a vehicle can be employed for the convenience of passengers in the storage of personal items.

These and other features, objects and advantages of the present invention will become apparent upon reading the following description thereof together with reference to the accompanying drawings.

DETAILED DESCRIPTION OF THE PREFERRED EMBODIMENT

Figure 1:
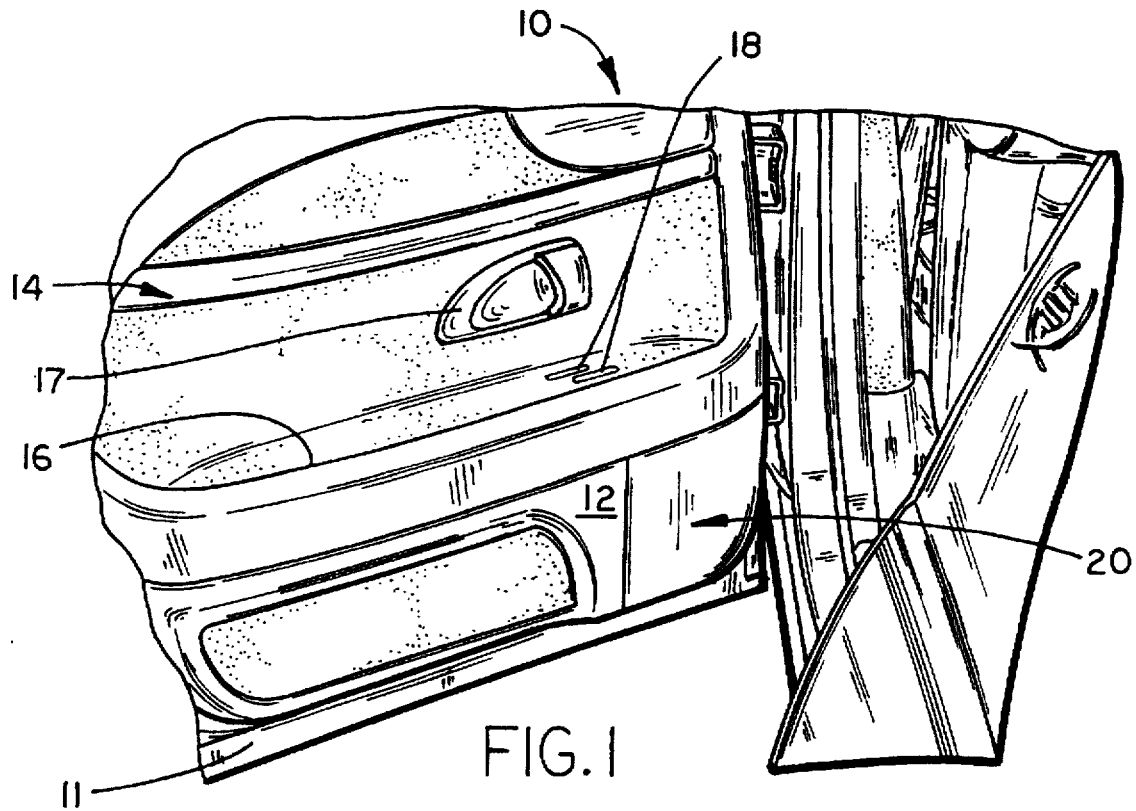
FIG. 1 is a fragmentary perspective view of a vehicle door including the storage compartment of the present invention shown in a closed position.
Figure 2:
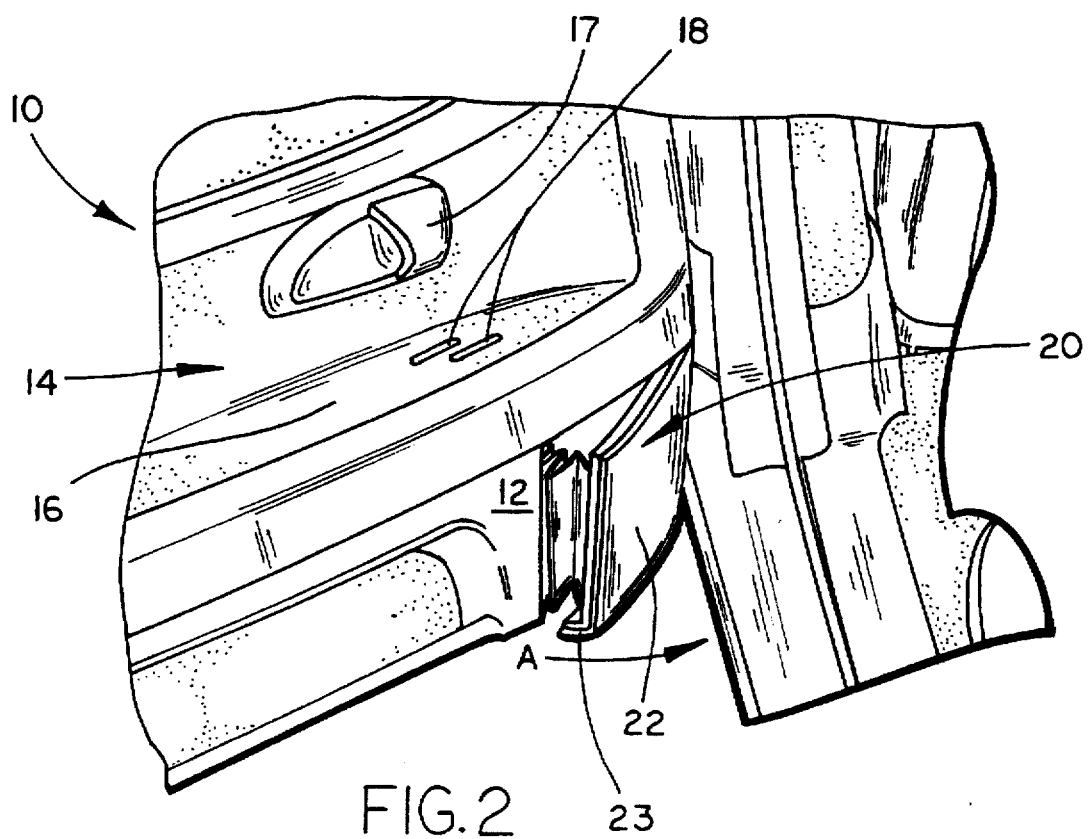
FIG. 2 is a fragmentary perspective view of the structure shown in FIG. 1, showing the storage compartment in a partially open position.
Figure 3:
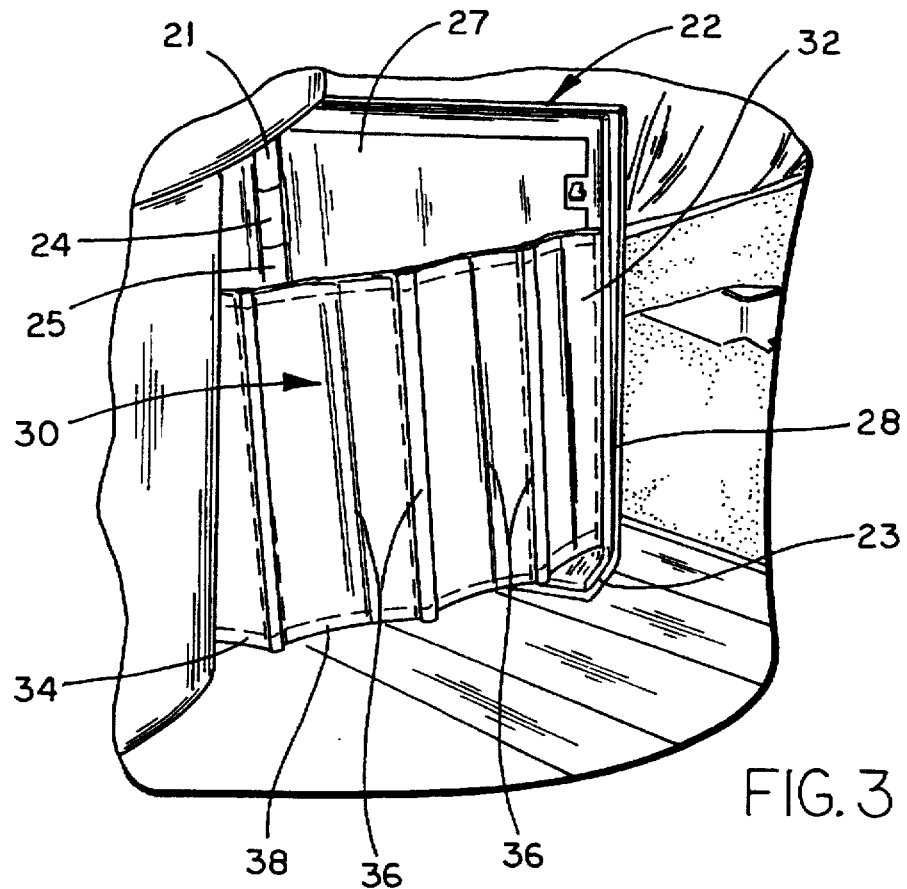
FIG. 3 is an enlarged fragmentary perspective view of the storage compartment shown in a fully open position.

Referring initially to FIGS. 1–3, there is shown a vehicle such as an automobile 10 having an accessory panel 12 which, in the embodiment shown, comprises a vehicle door 14. More specifically in the embodiment shown, there is shown the rear left passenger door having a lower panel which, as is typical, includes an armrest 16 integrally formed in the panel and which includes control switches 18 for windows, lights and the like, which are positioned in the armrest area below door latch 17. Panel 12 is formed near the lower edge 11 of the door and extends inwardly toward the vehicle interior to define the horizontal armrest area 16 leaving, therefore, a hollow space below the armrest which is suitable to accommodate the storage compartment 20 of the present invention. Other similar panel areas in a vehicle can also accommodate the unique foldable storage compartment which includes a cover 22 which moves from the closed position, seen in FIG. 1, by pivoting on a vertical hinge 24 (FIG. 3) to an open position, as seen in FIGS. 2 and 3. The cover 22 includes, in the preferred embodiment shown, a lower L-shaped lip 23 which conforms to the lower edge of panel 12 to provide a trim appearance to the storage compartment when closed, as seen in FIG. 1. The cover 22 can be molded of a suitable polymeric material to integrally include hinge sections 24 which mate with interleaved corresponding cylindrical hinge sections 25, which can be integrally formed on panel 12 during manufacture of the vehicle. A hinge pin (not shown) extends through cylindrical hinge sections 24 and 25 to pivotally mount the forward vertical edge 27 of cover 22 to the front corner of panel 12 and the door 14 illustrated.

Figure 4:
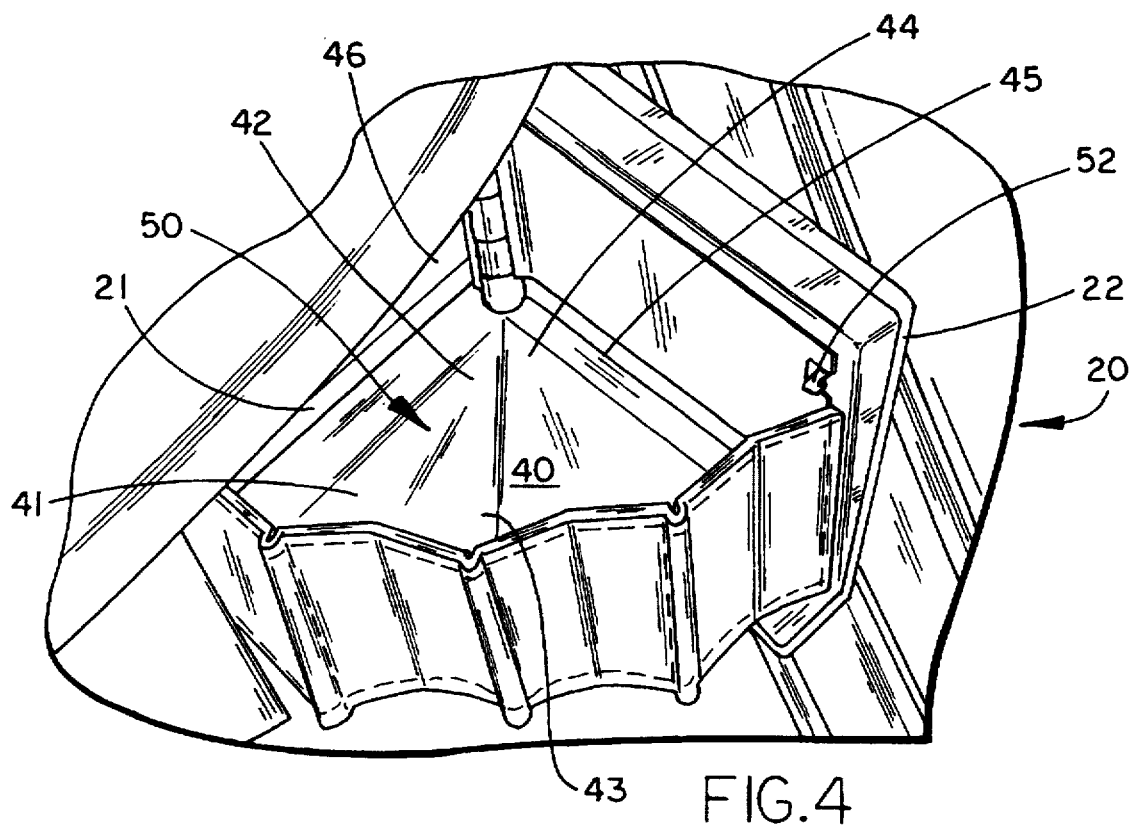
FIG. 4 is an enlarged fragmentary perspective view of the structure shown in FIG. 3 taken from above looking into the storage compartment.

A collapsible accordion-folded sidewall 30 has a forward vertical edge 32 secured to the inside edge 28 of cover 22 and an opposite edge 34 attached to the inside edge of panel 12 adjacent the opening 21 (FIG. 3) of the compartment, as best seen in FIGS. 3 and 4, to define, in conjunction with the foldable floor 40 (FIG. 4) a generally triangular storage compartment 50 having sufficient interior volume when open to temporarily hold a significant amount of personal items in a conveniently located area of the vehicle. The sidewall 30 is made of a flexible material such as fabric, leather or vinyl and is pleated at fold lines 36 to allow it to collapse within the panel 12 when the cover 22 is moved to a closed position. The lower edge 38 of sidewall 30 extends above the lip 23 of cover 22 and below the top of cover 22 so as to clear the access opening 21 in panel 12 when the storage compartment is closed.

Floor 40 is a bi-fold floor including a first triangular section 42 and a second triangular section 44 coupled along a folding seam 43. Edge 41 of floor section 42 is pivotally coupled to a vertically extending trim panel 46 within recess 21 of panel 12 by a flexible hinge. The hinge can be the floor material itself, which can be made of a pair of triangular rigid panels 42 and 44 covered with upholstery material to match that of sidewall 30 with the edge 41 of the upholstery material coupled to panel 46. Floor section 44 similarly has a flexible coupling 45 to the lower inside of cover 22. The outer ends of triangular floor sections 42 and 44 are curved to generally conform to the arcuate shape of the sidewall 30 when opened to substantially seal the storage compartment 50, although the free edges of the triangular sections 42 and 44 of floor 40 are not interconnected to the sidewall, such that when the door is closed, the fold line 43 moves upwardly allowing the floor to collapse as the sidewall 30 folds into the recess 21 in panel 12.

A catch 52 is mounted to the upper inside corner of cover 22 and is releasably received in a mating catch (not shown) mounted to panel 12 in the corner of recess 21 such that the cover 22 when closed remains latched. The storage compartment is opened by grasping the lower lip 23 of cover 22 and extending the storage compartment outwardly, as illustrated in FIGS. 1–3, in a direction indicated by arrow A in FIG. 2. When the bi-fold floor 40 is extended into a generally horizontal position as seen in FIG. 4, it serves to hold the compartment in a locked open position. In some embodiments, a spring hinge may be desirable to assist in holding the storage compartment in an open position.

With the foldable storage compartment of the present invention, a relatively small unused area of the vehicle can be used to house a generously sized storage compartment for temporarily holding relatively large articles for the convenience of vehicle occupants. Although not adapted for permanent storage of large items, the compartment also can hold some small items such as compact tissue holders even when moved to a closed position. Thus, with the storage compartment of the present invention, additional storage can be provided in a vehicle in locations previously unused. Various modifications to the preferred embodiment will become apparent to those skilled in the art but will fall within the spirit and scope of the invention as defined in the appended claims.

The embodiments of the invention in which an exclusive property or privilege is claimed are defined as follows:

1. A foldable storage compartment for a vehicle comprising:
    a vehicle panel having an opening;
    a cover pivotally mounted to said panel at a first edge of said opening;
    a floor coupled to a lower segment of said cover; and
    a flexible sidewall coupled to an edge of said cover generally orthogonal to said floor and to said panel at an opposite edge of said opening for movement to a collapsed position when said cover is closed and an extended position when said cover is opened.

2. The foldable storage compartment as defined in claim 1 wherein said floor is hinged to fold when said cover is closed.

3. The foldable storage compartment as defined in claim 2 wherein said sidewall is foldable.

4. The foldable storage compartment as defined in claim 3 wherein said sidewall has a plurality of accordion folded panels.

5. A foldable storage compartment for a vehicle comprising:
    a cover for pivotally mounting to an opening in a vehicle panel for movement in a generally vertical plane;
    a floor having multiple hinged sections coupled to said cover; and
    a flexible sidewall coupled to an edge of said cover generally orthogonal to said floor for movement to a collapsed position when said cover is closed and an extended position when said cover is opened to define a storage area.

6. The foldable storage compartment as defined in claim 5 wherein said floor sections are generally triangular.

7. The foldable storage compartment as defined in claim 6 wherein said sidewall is foldable.

8. The foldable storage compartment as defined in claim 7 wherein said sidewall has a plurality of accordion folded panels.

9. A foldable storage compartment for a vehicle comprising:
    a vehicle panel having an opening;
    a cover having one edge pivotally mounted to said panel at a first edge of said opening;
    a foldable floor coupled to said cover; and
    a flexible sidewall coupled to an edge of said cover opposite said one edge and generally orthogonal to said floor for movement to a collapsed position when said cover is closed and an extended position defining a storage compartment between said floor and said sidewall when said cover is opened.

10. The foldable storage compartment as defined in claim 9 and further including a trim panel mounted to said vehicle panel within said opening and wherein an edge of said floor is coupled to said trim panel.

11. The foldable storage compartment as defined in claim 9, wherein said floor is hinged to fold when said cover is closed.

12. The foldable storage compartment as defined in claim 9 wherein said sidewall has a plurality of accordion folded panels.

13. A storage compartment for a vehicle panel comprising:
    a vehicle panel having an opening;
    a trim panel mounted to said vehicle panel and recessed within said opening;
    a cover vertically mounted to said vehicle panel at a first edge of said opening for pivotal movement between open and closed positions;
    a flexible floor coupled to a lower edge of said cover and to said trim panel; and
    a flexible sidewall coupled to an edge of said cover generally orthogonal to said floor and to said panel at an opposite edge of said opening for movement to a collapsed position when said cover is closed and an extended position when said cover is opened.

14. The storage compartment as defined in claim 13 wherein said flexible floor comprises hinged sections allowing said floor to fold when said cover is closed.

15. The storage compartment as defined in claim 14 wherein said sidewall is foldable.

16. The storage compartment as defined in claim 15 wherein said sidewall has a plurality of accordion folded panels.

17. The storage compartment as defined in claim 16 wherein said floor comprises at least two generally triangular sections hingedly coupled to one another.

18. The storage compartment as defined in claim 17 wherein said panel comprises a door panel.

19. The storage compartment as defined in claim 13 wherein said panel comprises a door panel.

20. The storage compartment as defined in claim 19 wherein said sidewall has a plurality of accordion folded panels.

* * * * *